Figure 1:
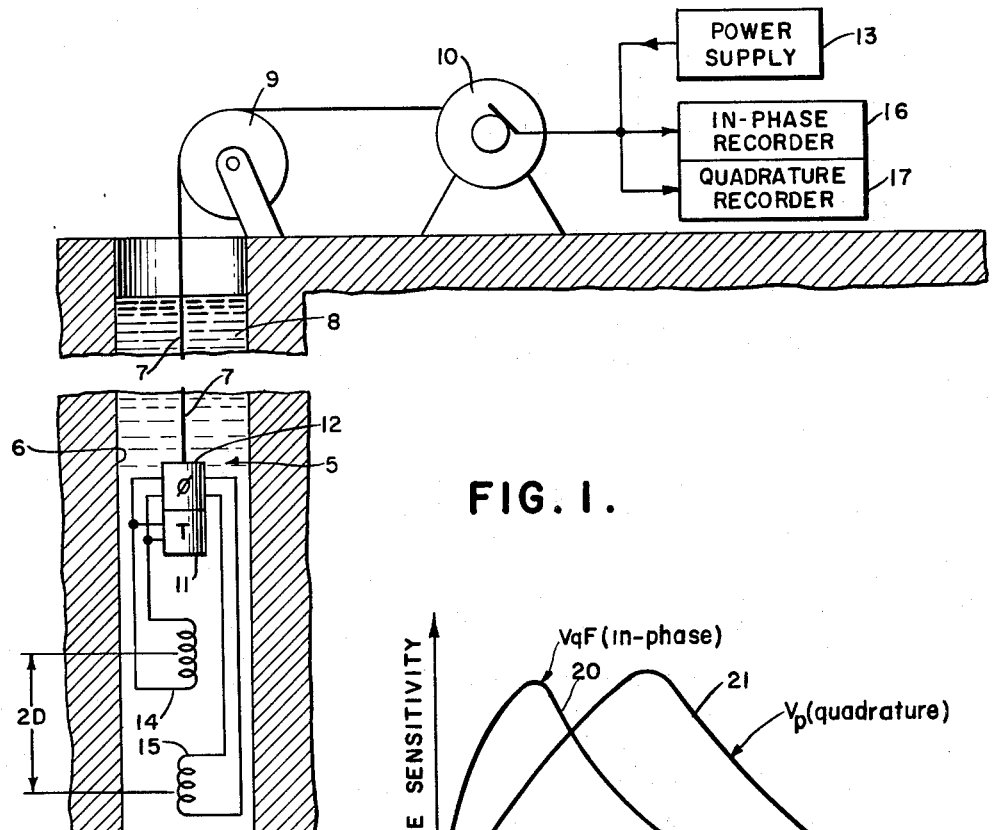

LATERAL DISTANCE FROM
LONGITUDINAL AXIS OF COIL SYSTEM

INVENTOR.
Harry S. Thomsen
BY
E. F. Bard
ATTORNEY 3,259,838
BOREHOLE INDUCTION LOGGING SYSTEM UTILIZING THE QUADRATURE SIGNAL COMPONENT AS AN INDICATION OF FORMATION CONDUCTIVITY
Harry Sandoe Thomsen, Tokyo, Japan, assignor to Dresser Industries, Inc., Dallas, Tex., a corporation of Delaware
Filed Feb. 21, 1963, Ser. No. 260,181
1 Claim. (Cl. 324—6)

This invention relates to induction logging systems for investigating earth formations traversed by a borehole, and more particularly to induction logging methods and apparatus which take into consideration the propagation effects on the electromagnetic waves passing through the subsurface earth formations.

In induction logging systems, an alternating current energized transmitting coil is lowered into a borehole to generate eddy currents concentric with the borehole, which in turn induce signals in a coaxially disposed receiving coil. The magnitude of the eddy currents is primarily a function of the earth formation conductivity and, hence, the magnitude of the signal detected by the receiving coil is a meaningful measure of this conductivity. Systems of this type are described in Patents 2,220,070 to Charles B. Aiken and 2,220,788 to Ralph W. Lohman. Improved induction logging apparatus utilizing a plurality of separate two-coil systems combined to reduce sensitivity at selected distances from the borehole and to reduce the vertical width of the laterally investigated zone, are shown in U.S. Patents 2,582,314 and 2,582,315 to Henri-Georges Doll.

From experience gained in working with these past systems, it has become known that the voltage induced in the receiver coil is made up of several components. One of these signal components is induced in the receiver coil because of the direct mutual inductance between the coils, this signal component having a quadrature relationship with respect to the energizing alternating current. This component is independent of the borehole characteristics and is therefore generally eliminated by appropriate balancing of multiple coil systems. A second component, induced in the receiver coil via the concentric eddy currents, has relatively well-known investigating characteristics and is generally assumed to be in phase with the transmitter current. This in-phase component is the component usually measured by the past induction logging systems, and was thought to provide the only meaningful measure of earth formation conductivity. Another component, in quadrature with the measured component and not as a result of the coil mutual inductance, was known to exist that was either eliminated by phase sensitive networks or ignored, since it was thought that this component was a measure of susceptibility and hence not related to formation conductivity.

A comprehensive analysis of signal components induced in the receiver coil has been presented in the article entitled "The Effect of Coil Design on the Performance of the Induction Log," by W. C. Duesterhoeft, Ralph E. Hartline and H. Sandoe Thomsen, appearing in "The Journal of Petroleum Technology," November 1961, beginning on page 1137. This analysis takes into account previously ignored propagation effects on electromagnetic waves passing through earth formations and shows that the receiver signal contains an out-of-phase component due to the eddy currents and that the quadrature component, as well as the in-phase component, is in fact also a measure of the earth formation conductivity. The susceptibility of the earth formation, when measured, was found to be of such a low value that this could not possibly account for the quadrature component known to exist. Even more significant, it has been found that the quadrature component has different conductivity investigating characteristics than does the in-phase component, and more particularly, it has been found that the quadrature component has a maximum sensitivity to earth formation conductivity in a region more distant from the center of the borehole.

Thus, an object of this invention is to provide induction logging using the quadrature signal induced in a receiver coil to thus investigate earth formation conductivity in a predetermined zone laterally displaced from the borehole.

Another object is to provide induction logging apparatus capable of investigating earth formation at greater lateral distances from the center of a bore hole without increasing the longitudinal spacing between transmitter and receiver coils.

Another object is to provide apparatus responsive to the in-phase signal and the quadrature signal generated in the receiving coil of an inducting logging system to thus simultaneously investigate two zones disposed at different lateral distances from the borehole.

A further object of this invention is to provide a method of induction well logging wherein the quadrature component induced in a receiving coil due to propagation is detected and recorded as a function of the vertical coil position within the borehole.

Still another object is in providing an induction well logging method wherein the in-phase and quadrature component of the signal induced in a receiving coil are separately detected and recorded as functions of the vertical depth of the coil system within the borehole.

Figure 2:
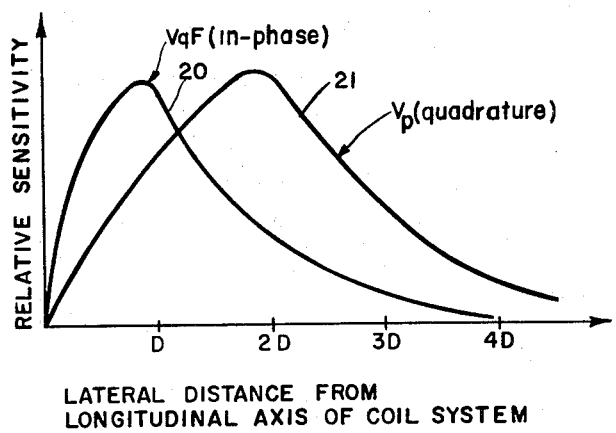
Figure 3:
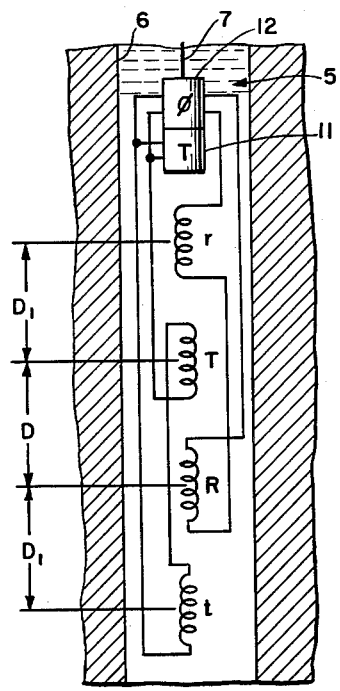

An understanding as to the manner in which these and other objects are achieved can best be obtained by referring to the following specification and drawings, the drawings forming a part of this specification, and wherein:

FIG. 1 schematically illustrates a two-coil induction logging system in accordance with this invention;

FIG. 2 is a graph illustrating typical lateral sensitivity curves for the two-coil induction logging system illustrated in FIG. 1; and FIG. 3 schematically illustrates a four-coil system which can be utilized in place of the two-coil system illustrated in FIG. 1.

In the aforementioned Duesterhoeft et al. article, a detailed mathematical analysis is presented of the signal induced in the receiver coil of an induction logging system. For simplicity, the signal $V_a$, induced in the receiving coil, can be represented by the following formulae:

$$V_a = V_m + V_e$$

and $$V_e = V_{gf} + V_p$$

The component $V_m$ represents the quadrature signal component induced by the mutual inductance between the transmitter and receiver coils and has no apparent earth formation investigating characteristics. The component $V_e$ represents the signal induced by the eddy currents in the earth formation and may be resolved into components $V_{gf}$ and $V_p$. The former is the component in phase with the transmitter current, while the latter is 90° out of phase therewith. Both are found to have a magnitude related to the conductivity of the earth formation. Furthermore, the components $V_{gf}$ and $V_p$ are found to have different sensitivity characteristics, component $V_p$ having the maximum sensitivity in a region more distant from the center of the borehole.

When an electromagnetic wave passes through sedimentary formations, such as those normally surrounding the borehole, there is an interaction between the wave and the formation, resulting in attenuation of the wave and reduction in velocity as compared to the free space velocity. Thus, the wave suffers a change in magnitude and phase in traveling from the transmitter into the formation and back to the receiver. If a predetermined phase relationship is selected, such as quadrature, the magnitude of the component measured will correspond primarily to electromagnetic wave energy having travelled the corresponding distance. It has been found that the point of maximum sensitivity for the quadrature component $V_p$ is approximately twice as far from the center of the borehole as is the point of maximum sensitivity corresponding to the in-phase component $V_{gf}$. Thus, it can be seen that the in-phase component and the quadrature component effectively have different zones of investigation, and therefore, by separately detecting the magnitude of these components, multiple depth investigations can be conducted simultaneously.

It should also be noted that, with the same longitudinal spacing between the transmitter and receiving coils, measuring the magnitude of the quadrature component $V_p$ provides an earth formation investigation at a greater distance from the center of the borehole. It has generally been known that increasing the longitudinal spacing between the transmitter and receiving coils increases the distance of the zone of investigation from the center of the borehole, and therefore, theoretically, it would be possible to investigate at any desired distance. However, the transmitter and receiving coils must be mounted on the same mandrel, and the mandrel must be sufficiently short to permit lowering into a rather contorted borehole. Thus, it is particularly advantageous to effectively increase the distance of the zone of investigation from the center of the borehole without increasing the longitudinal spacing between the transmitter and receiving coils, as is accomplished by measuring the quadrature component.

In accordance with the method of this invention, an alternating current energized transmitter-receiving coil assembly is lowered into the borehole. The in-phase and quadrature components induced in the receiving coil are separately detected and recorded as functions of the coil assembly position within the borehole. In this manner, a multiple investigation log is achieved representing earth formation conductivities at two different distances from the center of the borehole. If only the quadrature component is detected and recorded, this alone is advantageous, since this permits investigation at a greater distance from the borehole center without increasing the longitudinal spacing between the transmitter and receiving coils.

The induction logging system in accordance with this invention is shown schematically in FIG. 1 and includes a logging unit 5 suspended in a borehole 6 by means of a cable 7 which extends from the logging unit to the surface of the earth. Cable 7 passes over a pulley 9 to a suitable winch 10 which causes the logging unit to be raised and lowered in borehole 6. In some cases, the borehole may be empty, but in most cases would be filled by a drilling liquid 8 which may have a conductivity greater, or less than, the conductivity of the surrounding earth formation.

Logging unit 5 includes a transmitter unit 11 and a phase detector unit 12 preferably contained in a cylindrical cartridge. The transmitter unit includes an oscillator which provides an output signal preferably in the range of 20 kilocycles. This oscillator operates from direct current energy supplied by a power supply unit 13 located above ground and connected to the oscillator via slip rings on winch unit 10 and suitable conductors (not shown) included in cable 7. The output of transmitter unit 11 is connected to provide a reference signal to phase detector 12 and to energize a transmitter coil 14. A receiver coil 15 is connected to the input of phase detector 12. Transmitter coil 14 and receiver coil 15 are coaxially disposed and spaced apart by a longitudinal separation distance 2D, these coils preferably being wound on the same mandrel and encapsulated in the same cylindrical cartridge as transmitter unit 11 and phase detector 12.

Phase detector 12 consists of a pair of phase sensitive detectors of conventional design, and is operative to select the signal components generated in receiver coil 15 which are in-phase with the reference signal from transmitter unit 11, and those signals which have a quadrature relationship thereto, i.e., those having a 90° phase displacement with respect to the reference signal. Phase detector 12 also rectifies the alternating current signals received and thus provides two separate direct current signals proportional to the magnitude of the in-phase and quadrature components induced in the receiver coil. The two separate direct current signals from phase detector 12 are connected, respectively, to an in-phase recorder 16 and a quadrature recorder 17 via suitable conductors (not shown) in cable 7. Preferably, the in-phase recorder and the quadrature recorded are part of the same dual channel recorder having a separate stylus for each channel recording on the same strip chart. The recorder is so adapted that the strip chart moves in accordance with the longitudinal movement of logging unit 5 in the borehole. Thus, the magnitude of the in-phase component and the magnitude of the component, as detected in the receiver coil, are recorded separately on the same strip chart as a function of the vertical position of logging unit 5 within the borehole.

Transmitter unit 11 and phase detector unit 12 are preferably located down-hole close to the transmitter and receiving coils to eliminate the problems of conveying the high frequency alternating current signals throughout the length of the well. The cartridge, including the transmitting unit, the phase detector, and the transmitter and receiving coils, is preferably provided with a centering device of conventional design to maintain the cartridge approximately centered in the borehole.

The lateral sensitivity characteristics of the system shown in FIG. 1 is represented by curves 20 and 21 in FIG. 2, these curves indicating, respectively, the zones of investigation corresponding to the in-phase signal component $V_{gf}$ and the quadrature component $V_p$. Lateral sensitivity at a particular distance from the longitudinal axis of the coil system is effectively the response of the system to a theoretical concentric cylindrical shell of unit thickness and unit conductivity having a radius equal to the particular distance. If the medium surrounding the coil system is homogeneous, the theoretical cylindrical shells of different radii each contribute a proportional amount to the in-phase component $V_{gf}$, as detected by the receiver coil and as indicated by curve 20. Similarly, these cylindrical shells also contribute proportionately to the quadrature component $V_p$ (disregarding quadrature component $V_m$), as indicated by curve 21. The total responses are thus equal to the area under respective curves 20 and 21. In actual practice, the surrounding medium would not be homogeneous, and therefore, the curves would be modified somewhat by taking into consideration the individual conductivity of cylindrical shells at different radii.

The horizontal axis of the curves in FIG. 3 are lateral distances from the longitudinal axis of the coil system corresponding to the radii of the different symmetrical shells, this being measured in terms of the half-separation distance D between transmitter coil 14 and receiver coil 15. The vertical axis is the relative sensitivity value of the coil system to cylindrical shells at the respective distances. Curve 20 raises rapidly from the origin, reaches a maximum sensitivity value corresponding to a lateral distance of approximately 0.9D, and then falls off more slowly, becoming asymptotic to the horizontal axis. Curve 21 has a similar shape and rises rapidly from the origin to reach a maximum sensitivity value at a lateral distance of approximately 1.8D, and then falls off more slowly, becoming asymptotic to the horizontal axis. It should be noted that the zone of investigation associated with the in-phase component $V_{gf}$ centers about the lateral distance 9D, since this is the point of maximum sensitivity, while the zone of investigation associated with the quadrature component $V_p$ centers about a lateral distance of about 1.8D. In other words, the quadrature component is related to an investigation of the earth formation conductivity at a lateral distance approximately twice as great as that to which the in-phase component is related.

The mutual inductance component $V_m$ and the quadrature component $V_p$ both have a quadrature relationship with respect to the reference signal and therefore the corresponding output signal from phase detector 12 is related to their combined magnitude. The mutual inductance component $V_m$ is not related to the earth formation conductivity and therefore tends to remain relatively constant. Accordingly, the signal recorded by recorder 17 does not correspond to the absolute value of earth formation conductivity, but the changes in this recorded value do correspond to the changes in earth formation conductivity, and therefore this provides a meaningful indication. In some instances, it may be desirable to eliminate the effect of the mutual inductance component by providing an additional coil not coupled to the formation, or by providing a suitable bias in phase detector 12 or in the input circuit of recorder 17.

In many cases, it may be desirable to construct a coil system including a plurality of individual two-coil systems. By properly spacing the individual coils, and by properly selecting the relative number of turns, it is possible to substantially eliminate any mutual inductive coupling between the transmitter coils and the receiver coils. Thus, the mutual inductive component $V_m$ can be substantially eliminated. The use of multiple two-coil systems which eliminate the mutual inductance signal also improve the investigating characteristics of the tool by decreasing sensitivity in the area immediately adjacent the borehole. Multiple two-coil systems of this type are described, for example, in the aforementioned Doll patent. A four-coil system of this type, which can be utilized in place of the two-coil system in FIG. 1, as shown in FIG. 3.

The four-coil system includes a main transmitting coil T, and an auxiliary transmitting coil $t$, these coils being connected in series opposition to the output from transmitter unit 11. Also included is a main receiver coil R and an auxiliary receiver coil $r$, these receiver coils being connected in series opposition to the input of detector 12. The four coils are coaxially disposed such that the main transmitter coil and the main receiver coil are adjacent one another and laterally spaced apart by a distance D, and such that the auxiliary coils are disposed outside the main coils with the auxiliary receiver coil spaced by a distance $D_1$ from the main transmitter coil and such that the auxiliary transmitter coil is spaced by a distance $D_1$ from the main receiver coil and such that the auxiliary transmitter coil is spaced by a distance $D_1$ from the main receiver coil. The number of turns for each of the coils, and the longitudinal spacing between the coils, are selected to satisfy the following formula:

$$\frac{N_T N_R}{D^3} - 2\frac{N_T N_r}{(D_1)^3} + \frac{N_r N_t}{(D+2D_1)^3} = 0$$

$N_T$ and $N_t$ are the number of turns in the respective transmitter coils; and $N_R$ and $N_r$ are the number of turns in the respective receiver coils. D and $D_1$ are the separation distances as indicated in FIG. 3. It has been found that, when the four coils are arranged in this manner, there is no substantial mutual inductance between the transmitter coils and the receiver coils. Also, arranging the coils in this manner gives the desirable effect of decreasing the relative sensitivity in a region including the borehole and immediately adjacent areas.

It should be pointed out that a multiple two-coil system exists where there are two transmitter coils and a single receiver coil, and likewise where there is a single transmitter coil and two receiver coils. Such three-coil systems can also be arranged to eliminate the direct mutual coupling between the transmitter coils and receiving coils. Thus, for the purposes of this specification, when the terms "receiver coils" and "transmitter coils" are utilized with regard to multiple two-coil systems, the reference to coils may also refer to a single coil.

It should also be pointed out that other four-coil arrangements than that shown in FIG. 3 can be utilized and balanced to eliminate direct mutual inductance, as well as systems employing larger numbers of coils. The manner in which the other multiple coil systems are arranged and designed is described in greater detail in Patent 2,582,314, Doll.

While certain advantageous embodiments of the invention have been described in detail, these embodiments by no means exhaust all of the possible combinations within the scope of this invention. The scope of this invention is more particularly defined in the appended claim.

What is claimed is:

A method of induction logging by means of a pair of coils lowered into a borehole to investigate the earth formation traversed by the borehole, comprising the steps of
energizing one of the coils with alternating current to induce current flow in the earth formation surrounding the borehole,
receiving a signal in the other coil produced as a result of said induced current, said signal being composed of at least two signal components, simultaneously and separately selecting each of said signal components
one of said components being in phase with respect to said energizing alternating current, the other component of the received signal being in phase quadrature with respect to said energizing alternating current,
the magnitude of the said in phase component being proportional to the formation conductivity at some distance $D_1$ from the axis of the borehole and the magnitude of said quadrature component being proportional to the formation conductivity at a distance $D_2$ from the axis of said borehole wherein $D_2$ is greater than $D_1$,
separately recording the simultaneously detected quadrature and in phase components in accordance with the vertical depth within the borehole at which the measurements are taken to provide a record of the variation in conductivity with depth at the said two spaced distances $D_1$ and $D_2$ from the axis of the borehole.

References Cited by the Examiner

UNITED STATES PATENTS

| | | | |
|---|---|---|---|
| 2,582,314 | 1/1952 | Doll | 324—6 |
| 2,623,923 | 12/1952 | Zimmerman. | |
| 2,887,650 | 5/1959 | Ruddock et al. | 324—6 |
| 2,929,984 | 3/1960 | Puranen et al. | 324—6 |
| 2,995,699 | 8/1961 | Snellin et al. | 324—6 X |
| 3,052,835 | 9/1962 | Dunlap et al. | 324—1 |
| 3,147,429 | 9/1964 | Moran | 324—6 |

OTHER REFERENCES

Parasnis, Principles of Applied Geophysics, London, Methuen and Company, Ltd., N.Y., John Wiley and Sons, Inc., 1962, page 2.

WALTER L. CARLSON, *Primary Examiner.*

G. R. STRECKER, *Assistant Examiner.*